US012566618B2

(12) United States Patent
Dolan et al.

(10) Patent No.: US 12,566,618 B2
(45) Date of Patent: Mar. 3, 2026

(54) SYSTEMS, METHODS, AND APPARATUSES FOR IMPLEMENTING AI TO GENERATE A TIME-SENSITIVE NOTIFICATIONS RELATED TO CONFIGURATION OF GRAPHICAL USER INTERFACES

(71) Applicant: BANK OF AMERICA CORPORATION, Charlotte, NC (US)

(72) Inventors: Heather Roseann Dolan, Sarasota, FL (US); Jatin Agrawal, Clover, SC (US); Angela Caraccioli, Phoenix, AZ (US); Adithya Gadwale, Falls Church, VA (US); Dilip Raja, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 306 days.

(21) Appl. No.: 18/221,220

(22) Filed: Jul. 12, 2023

(65) Prior Publication Data

US 2025/0021352 A1     Jan. 16, 2025

(51) Int. Cl.
| | |
|---|---|
| *G06Q 10/109* | (2023.01) |
| *G06F 9/451* | (2018.01) |
| *H04L 51/21* | (2022.01) |
| *H04L 51/222* | (2022.01) |
| *G06Q 10/107* | (2023.01) |
| *H04L 51/224* | (2022.01) |

(Continued)

(52) U.S. Cl.
CPC ........... *G06F 9/451* (2018.02); *G06Q 10/107* (2013.01); *H04L 51/224* (2022.05); *H04L*

*51/226* (2022.05); *H04M 1/72454* (2021.01); *H04M 1/72484* (2021.01)

(58) Field of Classification Search
CPC .............. G06F 9/451; H04M 1/72484; H04M 1/72454; H04L 51/224; H04L 51/226; G06Q 10/107
See application file for complete search history.

(56) References Cited

U.S. PATENT DOCUMENTS

| | | | |
|---|---|---|---|
| 3,738,723 A | 6/1973 | Rudolph | |
| 7,249,159 B1 | 7/2007 | Horvitz | |

(Continued)

FOREIGN PATENT DOCUMENTS

EP          3414657 A1    12/2018

*Primary Examiner* — Mahelet Shiberou
(74) *Attorney, Agent, or Firm* — Moore & Van Allen PLLC; Lauren M. Stokes

(57) ABSTRACT

Systems, computer program products, and methods are described herein for implementing AI to generate a time-sensitive notifications related to configuration of graphical user interfaces. The present invention is configured to identify a primary user account; collect a primary user account dataset; generate a time sensitive notification AI engine associated with the primary user account; access, by the time sensitive notification AI engine, a user account database; identify at least one comparable user account and an associated at least one comparable user account dataset; compare, by the time sensitive notification AI engine, the primary user account dataset and the at least one comparable user account dataset; generate a time sensitive notification for the primary user account; and transmit a time sensitive notification interface component to a user device associated with the primary user account.

14 Claims, 9 Drawing Sheets

(51) Int. Cl.
    *H04L 51/226*           (2022.01)
    *H04M 1/72454*        (2021.01)
    *H04M 1/72484*        (2021.01)

(56)             References Cited

U.S. PATENT DOCUMENTS

| | | | |
|---|---|---|---|
| 9,032,321 B1 | 5/2015 | Cohen | |
| 9,100,357 B2 | 8/2015 | Duarte | |
| 9,176,747 B2 | 11/2015 | Rolston | |
| 9,256,876 B2* | 2/2016 | Vasant Akole | G06Q 20/405 |
| 9,736,028 B2 | 8/2017 | Ansari | |
| 9,965,750 B1 | 5/2018 | Bent, II | |
| 10,025,874 B2 | 7/2018 | Karp | |
| 11,057,655 B2 | 7/2021 | Brooks | |
| 11,270,314 B2 | 3/2022 | Gerling-Ospina | |
| 11,526,270 B2 | 12/2022 | Karunamuni | |
| 2008/0307362 A1 | 12/2008 | Chaudhri | |
| 2010/0115457 A1 | 5/2010 | Bombolowsky | |
| 2017/0329614 A1 | 11/2017 | Schon | |
| 2019/0137988 A1 | 5/2019 | Cella | |
| 2020/0125218 A1 | 4/2020 | Bender | |
| 2020/0359183 A1 | 11/2020 | Mao | |
| 2021/0064317 A1 | 3/2021 | Juenger | |
| 2021/0150623 A1* | 5/2021 | Rostami | G06Q 20/3676 |
| 2021/0243265 A1 | 8/2021 | Hammond | |
| 2022/0230149 A1* | 7/2022 | Greenbacker | G06Q 40/02 |
| 2022/0237700 A1* | 7/2022 | Sreenivasan | G06F 3/0488 |
| 2024/0095819 A1* | 3/2024 | Bakhle | G06Q 40/02 |
| 2025/0021976 A1* | 1/2025 | Yang | G06Q 20/42 |

* cited by examiner

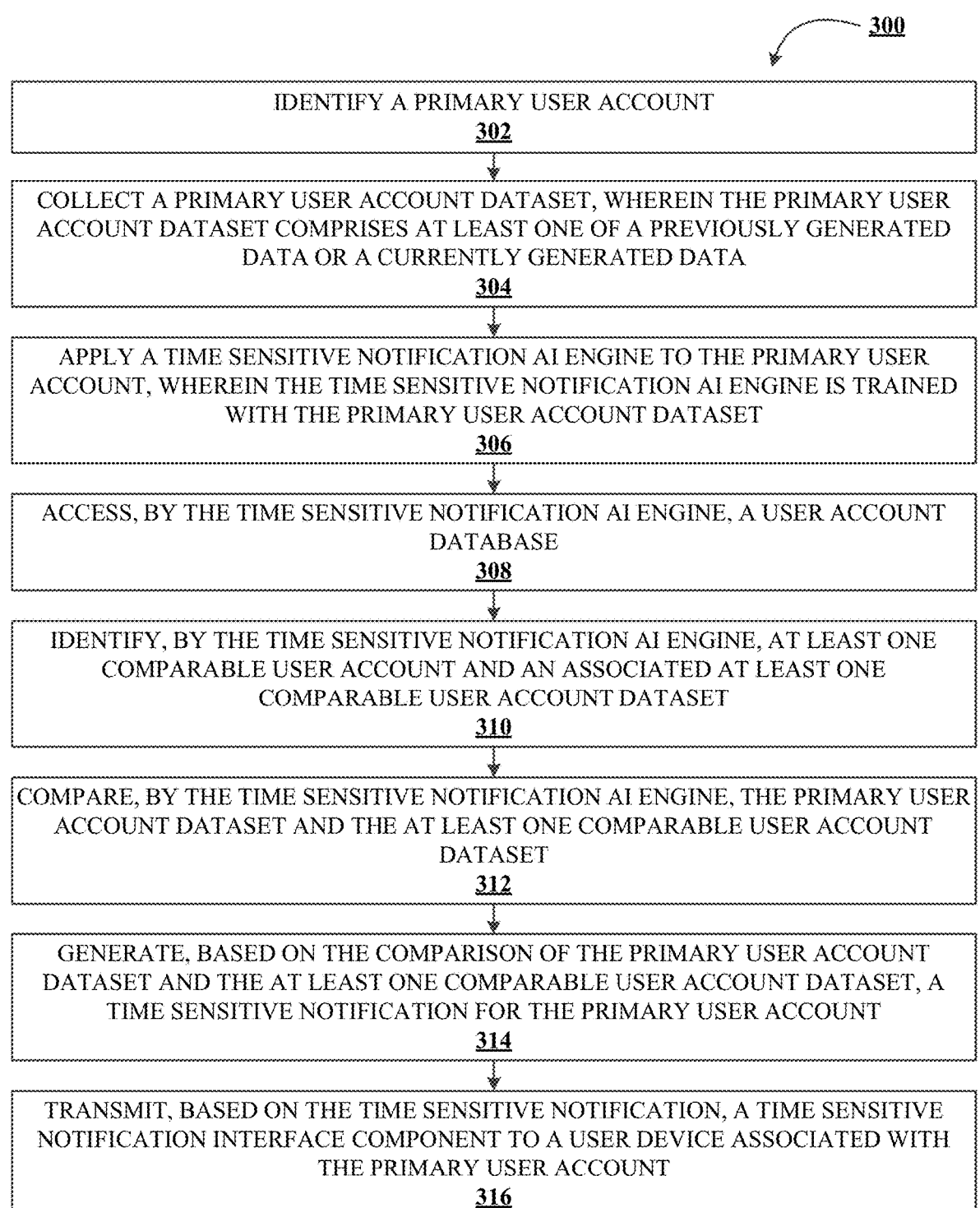

_300_

IDENTIFY A PRIMARY USER ACCOUNT
_302_

COLLECT A PRIMARY USER ACCOUNT DATASET, WHEREIN THE PRIMARY USER ACCOUNT DATASET COMPRISES AT LEAST ONE OF A PREVIOUSLY GENERATED DATA OR A CURRENTLY GENERATED DATA
_304_

APPLY A TIME SENSITIVE NOTIFICATION AI ENGINE TO THE PRIMARY USER ACCOUNT, WHEREIN THE TIME SENSITIVE NOTIFICATION AI ENGINE IS TRAINED WITH THE PRIMARY USER ACCOUNT DATASET
_306_

ACCESS, BY THE TIME SENSITIVE NOTIFICATION AI ENGINE, A USER ACCOUNT DATABASE
_308_

IDENTIFY, BY THE TIME SENSITIVE NOTIFICATION AI ENGINE, AT LEAST ONE COMPARABLE USER ACCOUNT AND AN ASSOCIATED AT LEAST ONE COMPARABLE USER ACCOUNT DATASET
_310_

COMPARE, BY THE TIME SENSITIVE NOTIFICATION AI ENGINE, THE PRIMARY USER ACCOUNT DATASET AND THE AT LEAST ONE COMPARABLE USER ACCOUNT DATASET
_312_

GENERATE, BASED ON THE COMPARISON OF THE PRIMARY USER ACCOUNT DATASET AND THE AT LEAST ONE COMPARABLE USER ACCOUNT DATASET, A TIME SENSITIVE NOTIFICATION FOR THE PRIMARY USER ACCOUNT
_314_

TRANSMIT, BASED ON THE TIME SENSITIVE NOTIFICATION, A TIME SENSITIVE NOTIFICATION INTERFACE COMPONENT TO A USER DEVICE ASSOCIATED WITH THE PRIMARY USER ACCOUNT
_316_

FIGURE 3

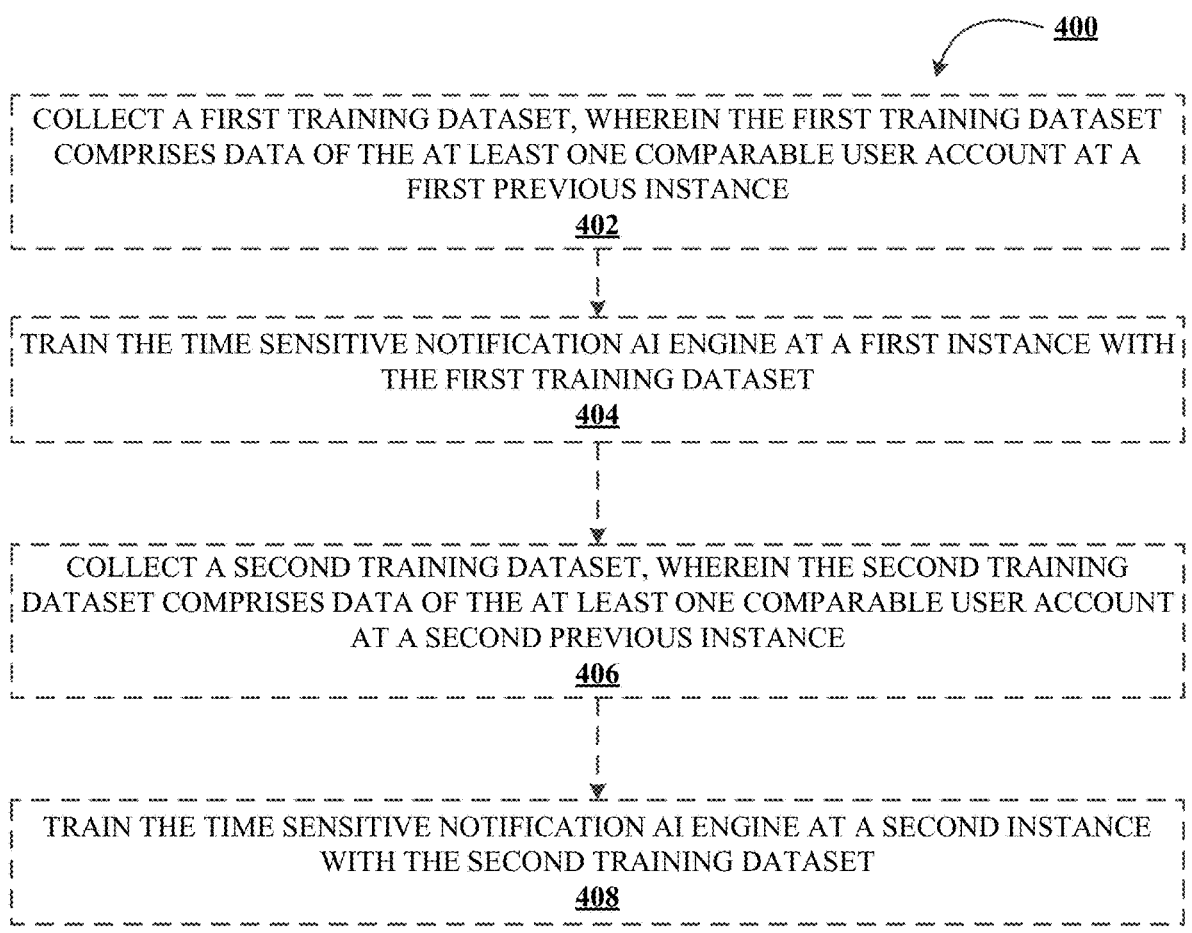

COLLECT A FIRST TRAINING DATASET, WHEREIN THE FIRST TRAINING DATASET COMPRISES DATA OF THE AT LEAST ONE COMPARABLE USER ACCOUNT AT A FIRST PREVIOUS INSTANCE
402

TRAIN THE TIME SENSITIVE NOTIFICATION AI ENGINE AT A FIRST INSTANCE WITH THE FIRST TRAINING DATASET
404

COLLECT A SECOND TRAINING DATASET, WHEREIN THE SECOND TRAINING DATASET COMPRISES DATA OF THE AT LEAST ONE COMPARABLE USER ACCOUNT AT A SECOND PREVIOUS INSTANCE
406

TRAIN THE TIME SENSITIVE NOTIFICATION AI ENGINE AT A SECOND INSTANCE WITH THE SECOND TRAINING DATASET
408

DETERMINE A CURRENT GEOGRAPHIC LOCATION ASSOCIATED WITH THE
PRIMARY USER ACCOUNT, WHEREIN THE DETERMINATION OF THE CURRENT
GEOGRAPHIC LOCATION IS BASED ON AT LEAST ONE OF THE USER DEVICE
ASSOCIATED WITH THE PRIMARY USER ACCOUNT OR AT LEAST ONE PREVIOUSLY
GENERATED DATASET
502

SYSTEMS, METHODS, AND APPARATUSES FOR IMPLEMENTING AI TO GENERATE A TIME-SENSITIVE NOTIFICATIONS RELATED TO CONFIGURATION OF GRAPHICAL USER INTERFACES

FIELD OF THE INVENTION

The present invention embraces a system for implementing AI to generate a time-sensitive notifications related to configuration of graphical user interfaces (GUIs).

BACKGROUND

Accurate predicting, tracking, and determination of data transmissions is more difficult than ever as data transmissions occur in such a large volume every day. Thus, there exists a need for a system to accurately, efficiently, dynamically, and securely track data transmissions in order to accurately predict future data transmissions and even generate time-sensitive notifications for the future data transmissions without undue burdens on computing systems, processing systems, databases, and communications devices.

Applicant has identified a number of deficiencies and problems associated with implementing AI to generate a time-sensitive notifications related to configuration of graphical user interfaces (GUIs). Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing artificial intelligence (AI) to generate a time-sensitive notification related to configuration of graphical user interfaces (GUIs) is provided. In some embodiments, the system may comprise a memory device with computer-readable program code stored thereon; at least one processing device, wherein executing the computer-readable code is configured to cause the at least one processing device to perform the following operations: identify a primary user account; collect a primary user account dataset, wherein the primary user account dataset comprises at least one of a previously generated data or a currently generated data; apply a time sensitive notification AI engine to the primary user account, wherein the time sensitive notification AI engine is trained with the primary user account dataset; access, by the time sensitive notification AI engine, a user account database; identify, by the time sensitive notification AI engine, at least one comparable user account and an associated at least one comparable user account dataset; compare, by the time sensitive notification AI engine, the primary user account dataset and the at least one comparable user account dataset; generate, based on the comparison of the primary user account dataset and the at least one comparable user account dataset, a time sensitive notification for the primary user account; and transmit, based on the time sensitive notification, a time sensitive notification interface component to a user device associated with the primary user account.

In some embodiments, the computer-readable code may further be configured to cause the at least one processing device to perform the following operations: collect a first training dataset, wherein the first training dataset comprises data of the at least one comparable user account at a first previous instance; train the time sensitive notification AI engine at a first instance with the first training dataset; collect a second training dataset, wherein the second training dataset comprises data of the at least one comparable user account at a second previous instance; and train the time sensitive notification AI engine at a second instance with the second training dataset.

In some embodiments, the computer-readable code may further be configured to cause the at least one processing device to perform the following operation to determine a current geographic location associated with the primary user account, wherein the determination of the current geographic location is based on at least one of the user device associated with the primary user account or at least one previously generated dataset. In some embodiments, the determination of the current geographic location is by the time sensitive notification AI engine based on the at least one previously generated dataset.

In some embodiments, the computer-readable code may further be configured to cause the at least one processing device to perform the following operations: determine at least one primary account attribute of the primary user account, wherein the at least one primary account attribute comprises at least one of an account type attribute, a historical transmission attribute, a geolocation attribute, a physical characteristic attribute, or an objective attribute; determine at least one comparable attribute based on the at least one primary account attribute; and identify the at least one comparable user account based on the at least one comparable user account comprising the at least one comparable attribute. In some embodiments, the objective attribute comprises an objective attribute input or selected by the primary user account.

In some embodiments, the computer-readable code may further be configured to cause the at least one processing device to perform the following operations: receive, based on the transmission of the time sensitive notification interface component, a primary user input from the user device, wherein the primary user input comprises an acceptance of the time sensitive notification or a rejection of the time sensitive notification; and train the time sensitive notification AI engine with the primary user input.

In some embodiments, the computer-readable code may further be configured to cause the at least one processing device to perform the following operations: identify, based on the transmission of the time sensitive notification interface component, a time-lapse of the time sensitive notification interface component, wherein the time-lapse comprises a pre-determined period for the time sensitive notification interface component to configure a GUI of the user device; determine the time-lapse of the time sensitive notification interface component meets the pre-determined period; identify, based on the time-lapse of the time sensitive notification interface component meeting the pre-determined period, a non-user input; and train the time sensitive notification AI engine with the non-user input. In some embodiments, the computer-readable code may further be configured to cause the at least one processing device to perform the following operation: configure, based on the time-lapse of the time sensitive notification interface component meeting the pre-determined period, the GUI of the user device with a pre-notification interface component. In some embodiments, the computer-readable code may further be configured to cause the at least one processing device to perform the following operations: identify a real-time transmission associated with the time sensitive notification; and train the time sensitive notification AI engine with the real-time transmission.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
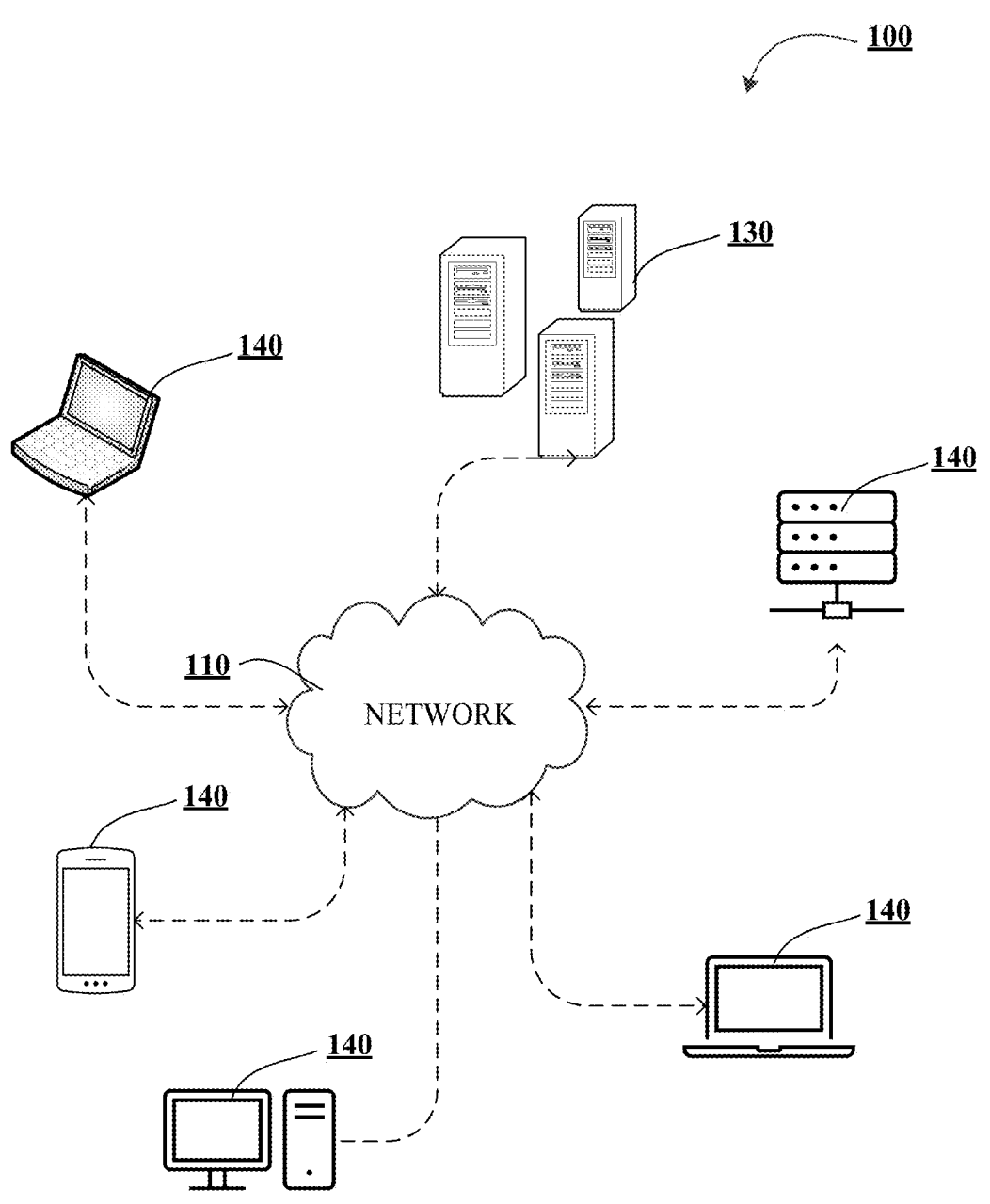
Figure 1B:
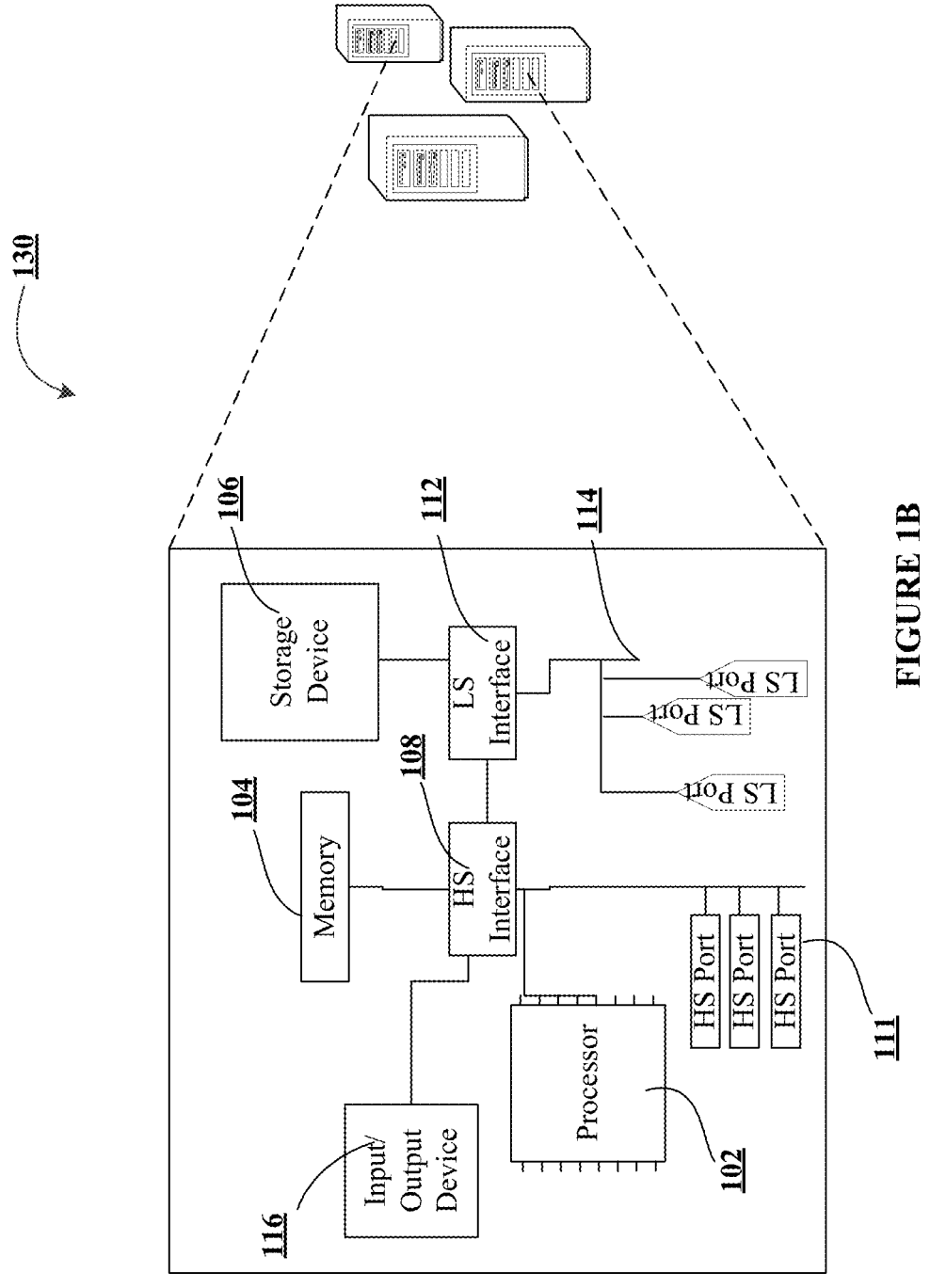
Figure 1C:
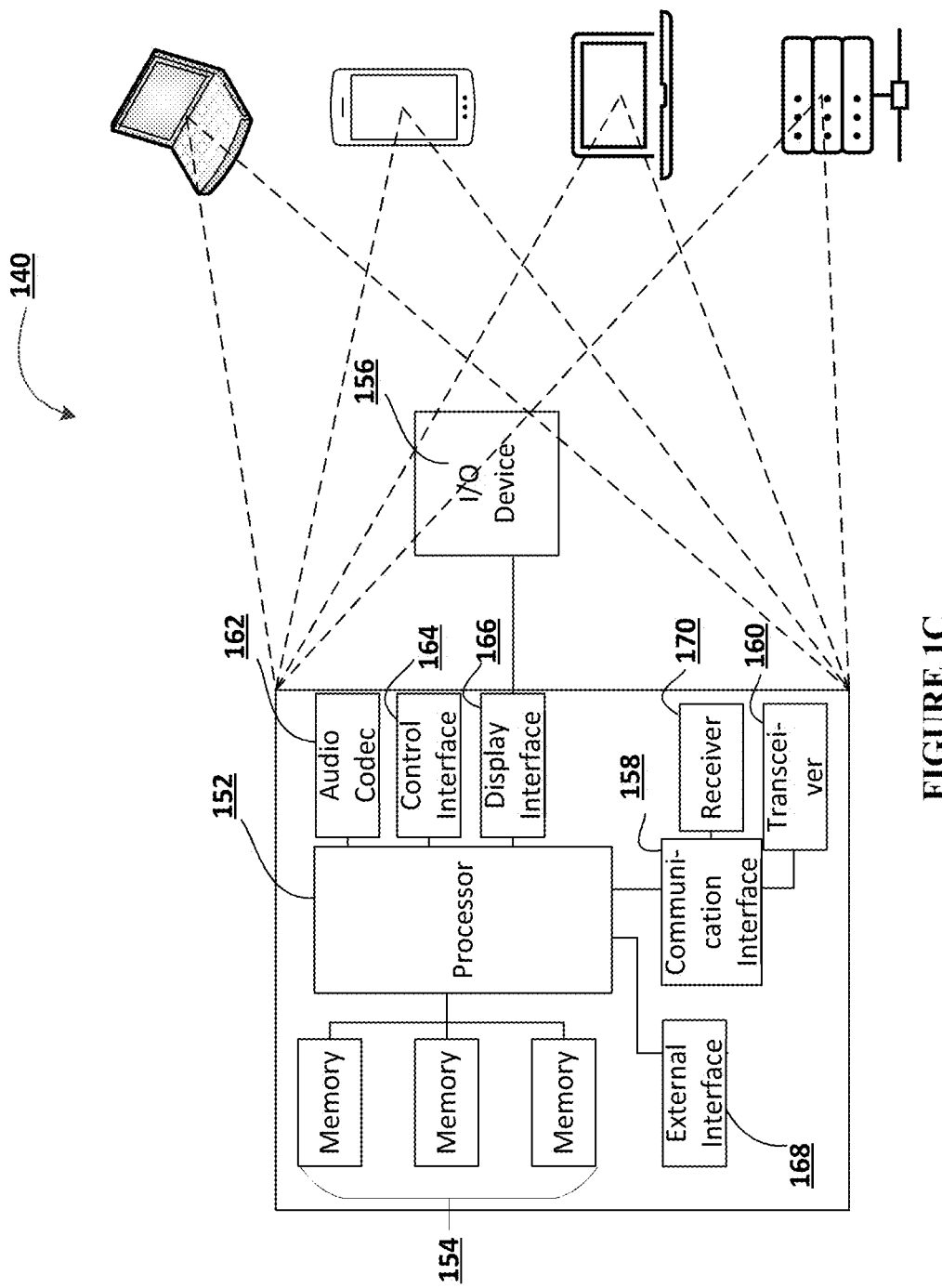
Figure 2:
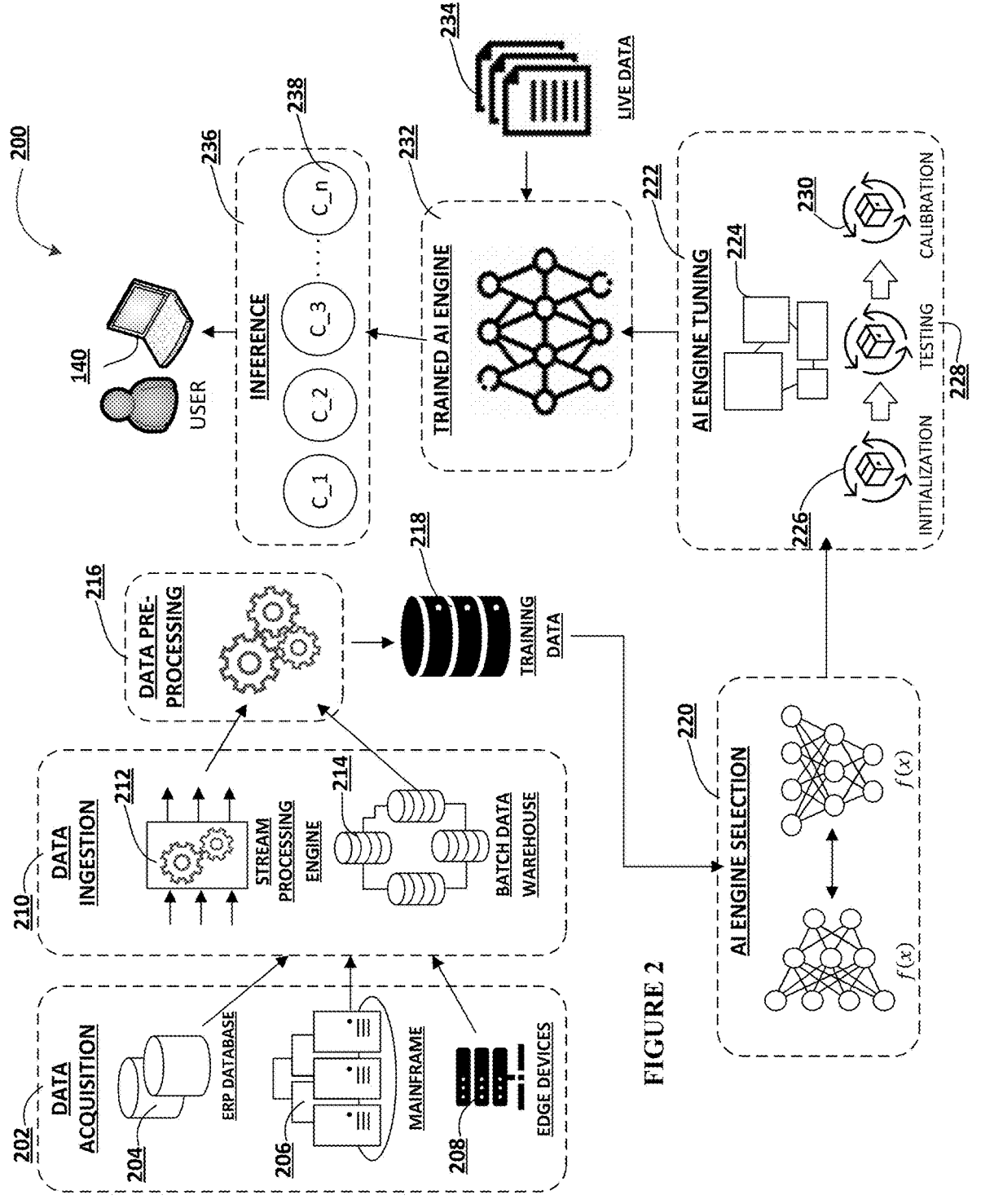
Figure 5:
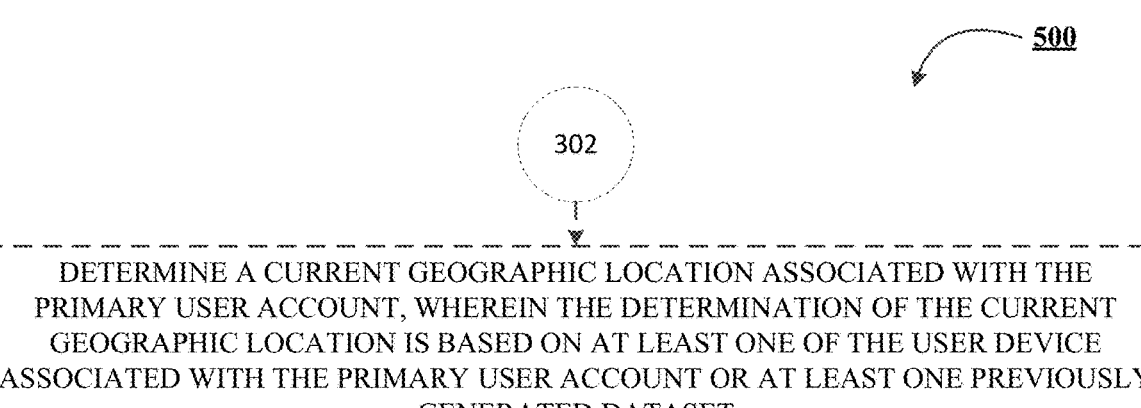
Figure 6:
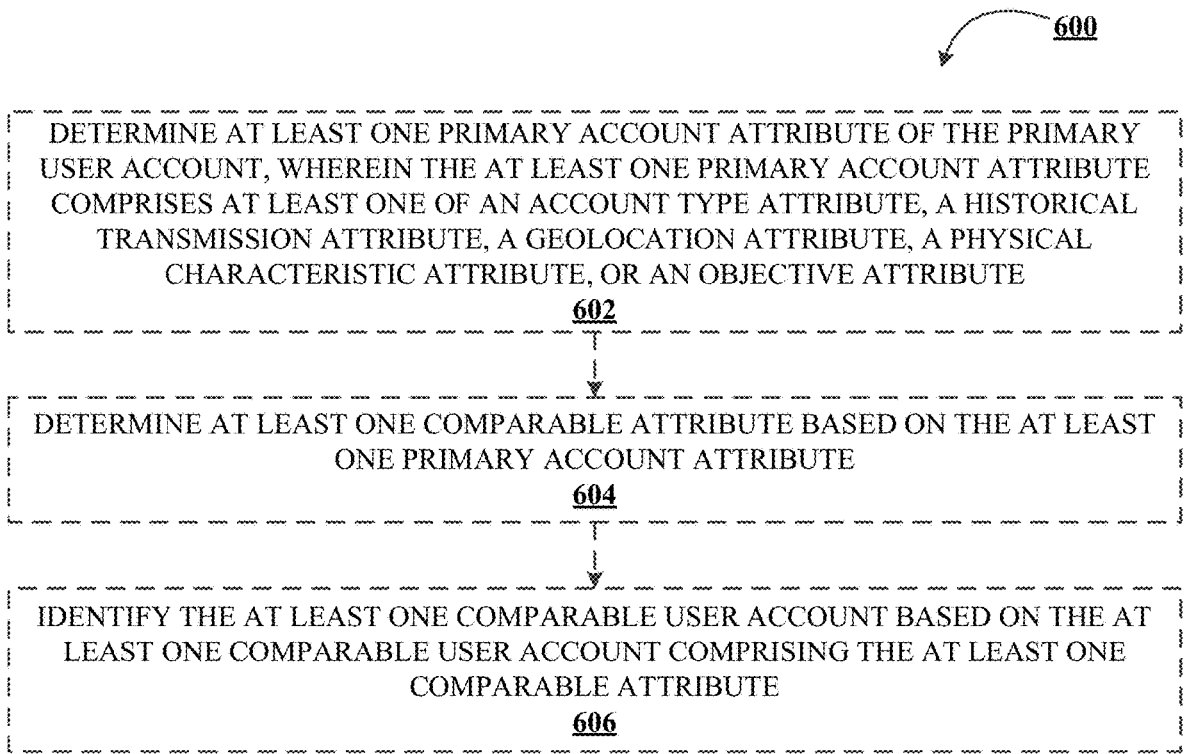
Figure 7:
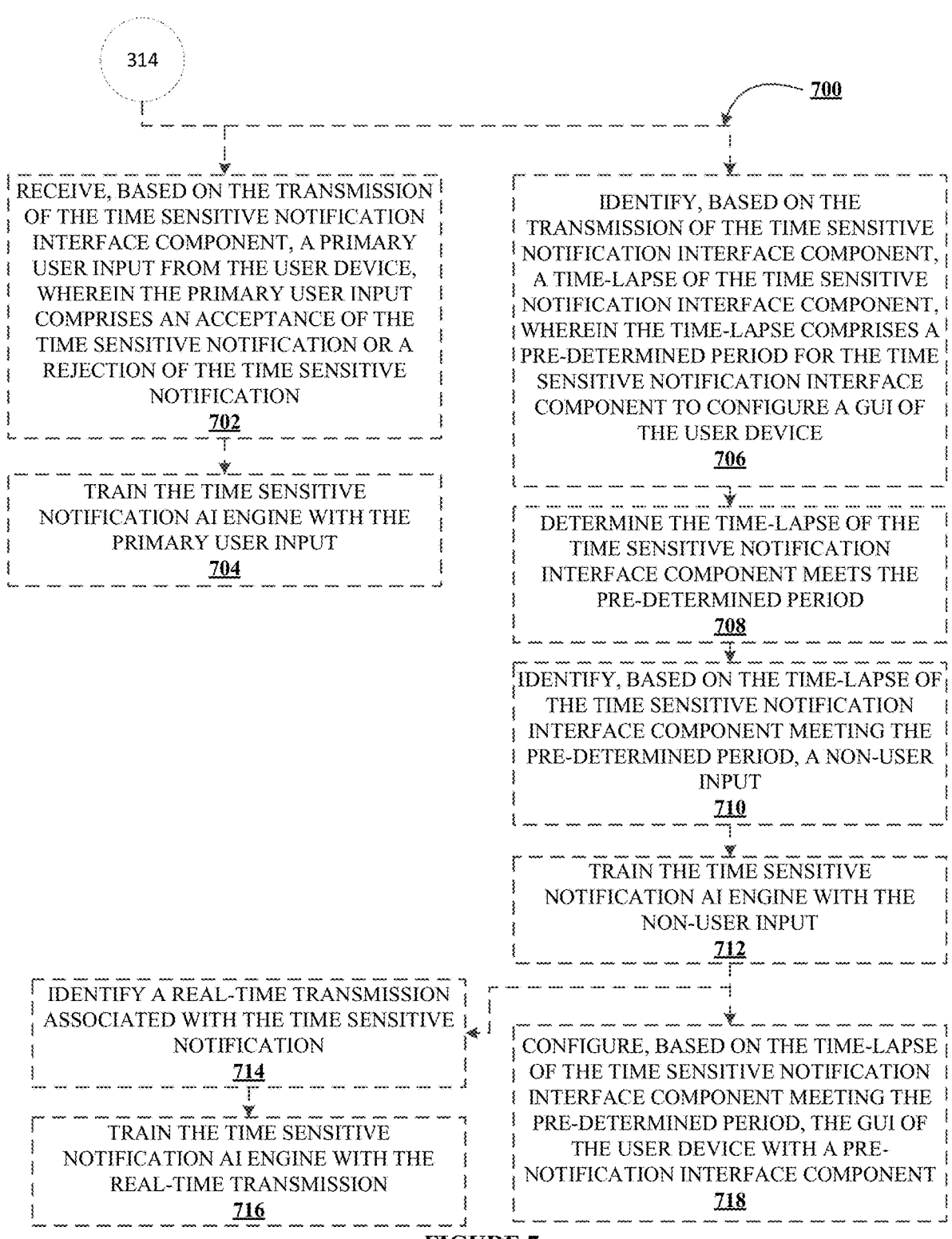

Having thus described embodiments of the invention in general terms, reference will now be made the accompanying drawings, wherein:

FIGS. 1A-1C illustrates technical components of an exemplary distributed computing environment for implementing AI to generating a time-sensitive notifications related to configuration of graphical user interfaces (GUIs), in accordance with an embodiment of the invention;

FIG. 2 illustrates technical components of an exemplary artificial intelligence (AI) subsystem, in accordance with an embodiment of the invention;

FIG. 3 illustrates a process flow for implementing AI to generate a time-sensitive notifications related to configuration of GUIs, in accordance with an embodiment of the invention;

FIG. 4 illustrates a process flow for training a time sensitive notification AI engine, in accordance with an embodiment of the invention;

FIG. 5 illustrates a process flow for determining a current geographic location associated with the primary user account, in accordance with an embodiment of the invention;

FIG. 6 illustrates a process flow for identifying at least one comparable user account, in accordance with an embodiment of the invention; and FIG. 7 illustrates a process flow for determining an acceptance, an ignorance, or a rejection of the time sensitive notification, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," "resource transmissions," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Accurate predicting, tracking, and determination of data transmissions is more difficult than ever as data transmissions occur in such a large volume every day. Specifically, and by way of example, issues especially arise where data transmissions are used to track resource transmissions (such as payments, investments, and/or the like) and the user associated with the data transmissions wishes to accurately track and curb the data transmissions to meet certain objectives/goals. Further, and as shown and described herein, there exists a need for the accurate prediction of future data transmissions and the accurate generation of push notifications to send to a user device to prevent such data transmissions from occurring and/or to request certain data transmissions occur (e.g., transmitting resources to a resource storage account such as a savings account) to meet the user's objectives/goals. Thus, there exists a need for a system to accurately, efficiently, dynamically, and securely track data transmissions in order to accurately predict future data transmissions and even generate time-sensitive notifications for the future data transmissions without undue burdens on computing systems, processing systems, databases, and communications devices.

Accordingly, the present disclosure provides a system (e.g., time sensitive notification system), method and/or apparatus configured to identify a primary user account (e.g., a primary user which the time sensitive notification system is concerned with predicting data/resource transmissions of); collect a primary user account dataset, wherein the primary user account dataset comprises at least one of a previously generated data (e.g., historical data) or a currently generated data (e.g., current data such as current geographical data, current resource storage account data, and/or the like); and apply a time sensitive notification AI engine to the primary user account, wherein the time sensitive notification AI engine is trained with the primary user account dataset. Further, the time sensitive notification system may be configured to access, by the time sensitive notification AI engine, a user account database; identify, by the time sensitive notification AI engine, at least one comparable user account and an associated at least one comparable user account dataset (e.g., comparable user accounts with similar goals/objectives, similar historical and/or current data, and/ or the like); compare, by the time sensitive notification AI engine, the primary user account dataset and the at least one comparable user account dataset; generate, based on the comparison of the primary user account dataset and the at least one comparable user account dataset, a time sensitive notification for the primary user account; and transmit, based on the time sensitive notification, a time sensitive notification interface component (e.g., a data packet for the push notification on the user device's GUI) to a user device associated with the primary user account.

Thus, and as described herein, the time sensitive notification interface component-which comprises the data of the time sensitive notification—may be transmitted to the primary user's user device for configuration of the GUI of the user device at a time when the time sensitive notification will likely have the greatest impact. For instance, and where a primary user has set a goal for the time sensitive notification system, such as saving enough resources to purchase a house within a certain time, then the time sensitive notification system may use this goal alone with the other data of the primary user account to determine what other similar user accounts have done to reach the same or similar goal (e.g., comparable user accounts). Once the time sensitive notification system has determined the comparable user accounts, the time sensitive notification system may generate push notifications to transmit to the primary user's user device to remind the primary user of what actions or inactions the primary user may take in order to reach their goal, which are based on what comparable user accounts have done. Additionally, the time sensitive notification system may base this push notification on the geographical location of the primary user (which may either be determined in real time or predicted based on historical data), and transmit the push notification at a time it will have the greatest impact, such as when the primary user typically transmits resources when at a particular geographical location (such as a restaurant or bar).

What is more, the present invention provides a technical solution to a technical problem. As described herein, the technical problem includes the accurate, efficient, and dynamic tracking and prediction of data transmissions and accurate generation of time sensitive notifications based on the predicted data transmissions. The technical solution presented herein allows for the accurate, efficient, dynamic, and secure. In particular, time sensitive notification system is an improvement over existing solutions to track data transmissions in order to accurately predict future data transmissions and even generate time-sensitive notifications for the future data transmissions without undue burdens on computing systems, processing systems, databases, and communications devices, (i) with fewer steps to achieve the solution, thus reducing the amount of computing resources, such as processing resources, storage resources, network resources, and/or the like, that are being used; (ii) providing a more accurate solution to problem, thus reducing the number of resources required to remedy any errors made due to a less accurate solution (e.g., by predicting the data transmissions using an AI engine, the time sensitive notification system accurately predicts and generates push notifications without needing to constantly determine geolocations and/or current resource transmission data); (iii) removing manual input and waste from the implementation of the solution, thus improving speed and efficiency of the process and conserving computing resources (e.g., removing manual input of data transmissions and geolocation data); (iv) determining an optimal amount of resources that need to be used to implement the solution, thus reducing network traffic and load on existing computing resources (and further by automatically and dynamically configuring the GUI on the primary user's user device between the time sensitive notification interface component and the pre-notification interface component allows for accurate and dynamic solution for user devices to not have to store expired interface components). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing AI to generate a time-sensitive notifications related to configuration of GUIs 100, in accordance with an embodiment of the invention. As shown in FIG. 1A, the distributed computing environment 100 contemplated herein may include a system 130 (i.e., a time sensitive notification system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier.

The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for implementing AI to generate a time-sensitive notifications related to configuration of GUIs, in accordance with an embodiment of the disclosure. In some embodiments, a system (e.g., similar to one or more of the systems described herein with respect to FIGS. 1A-1C) may perform one or more of the steps of process flow 300. For example, a time sensitive notification system (e.g., the system 130 described herein with respect to FIG. 1A-1C) may perform the steps of process 300. In some embodiments, an artificial intelligence engine (e.g., such as the AI engine shown in FIG. 2) may perform some or all of the steps described in process flow 300.

As shown in block 302, the process flow 300 may include the step of identifying a primary user account. For instance, the time sensitive notification system may identify the primary user account by identifying the user account which the time sensitive notification system (and the time sensitive notification AI engine) will focus on at a current period. In some embodiments, the user account the time sensitive notification system will analyze at a current period may further comprise a particular goal, which the time sensitive notification system may use to identify the primary user account, and/or other such factors and/or attributes being met (e.g., a particular geolocation attribute, a particular acceptance by the user account to be considered by the time sensitive notification system, and/or a particular pattern of the user account based on their historical data), and/or the like. In some embodiments, the time sensitive notification system may identify the primary user account based on the associated user account selecting, agreeing, and/or accepting particular conditions to be considered by the time sensitive notification system, such as a condition requesting the user account accept that the time sensitive notification system will track the user account's data, resource transmission(s), goal(s), geolocation(s), and/or the like.

As shown in block 304, the process flow 300 may include the step of collecting a primary user account dataset, wherein the primary user account dataset comprises at least one of a previously generated data or a currently generated data. By way of non-limiting example, the time sensitive notification system may collect primary user account data as a dataset, such as by collecting the data including the user account's historical data (i.e., previously generated data regarding the user account's total resources, resource transmission recipient identifiers and sender identifiers resource transmissions, previous geolocations, previous goal(s), time stamps, and/or the like) and current data (e.g., current pending resource transmissions, current resource transmission recipient identifiers and sender identifiers, current geolocation data, current goal(s), time stamps, and/or the like). In some embodiments, the historical data may additionally and/or alternatively comprise previously recorded data based on the user account and its associated resource accounts, geolocation(s), goal(s), and/or the like, which may have originated and been generated within another entity's database and shared across a network (such as network 110 of FIG. 1A).

In some embodiments, the primary user account dataset may be collected from the system's own database, from a database linked with a manager of the time sensitive notification system (such as where the manager is a financial institution and comprises its own database), from a database operated and/or updated by a client of the time sensitive notification system (e.g., where a client is the financial institution of the use), and/or the like. Thus, and as described herein, the time sensitive notification system may be used to generate notifications for the primary user account based on times where the notifications will be most helpful and most pertinent for the user at the particular time and/or particular geolocation.

As shown in block 306, the process flow 300 may include the step of applying a time sensitive notification AI engine to the primary user account, wherein the time sensitive notification AI engine is trained with the primary user account dataset. By way of non-limiting example, the time sensitive notification system may generate the time sensitive notification AI which is trained with user account datasets, which may further comprise at least one primary user account dataset(s). Such training of the time sensitive notification AI engine is discussed in further detail below with respect to FIG. 4.

In some embodiments, the time sensitive notification AI engine may be trained with a plurality of user account datasets, whereby the time sensitive notification AI engine may identify general patterns of users and their associated data (including resource transmissions), geolocation patterns associated with the resource transmissions, goals of a plurality of users and whether certain users have met their goals and what they're doing to meet their goals, and/or the like. Based on this training and based on a particular user account's dataset (current and historical data and associated resource transmissions and geolocation data), the time sensitive notification AI engine may identify the primary user account's goal (or suggested goal) and determine what other user accounts in similar positions (e.g., with respect to goal(s), resource transmission(s), physical characteristics, geolocation, and/or the like) have done to reach their associated goal(s). Based on this determination, the time sensitive notification AI engine may generate a notification (a time sensitive notification) for the primary user account which will be sent at a particular time when it is likely to have the greatest impact (e.g., sent when the primary user is at a particular geolocation or likely to be at a particular location based on previously identified patterns in their historical data).

As shown in block 308, the process flow 300 may include the step of accessing, by the time sensitive notification AI engine, a user account database. In some embodiments, the time sensitive notification system may access a user account database by accessing an entity's database, whereby the entity is associated with the time sensitive notification system as a manager, a client, and/or the like (such as a financial institution's database). The user account database may be used by the time sensitive notification AI engine for training (which is described in more detail below), whereby based on the primary user account and its associated data of the primary user account dataset, the time sensitive notification AI engine may determine a different user account from the user account database which is similar or comparable to the primary user account (i.e., at least one comparable user account). For instance, the time sensitive notification AI engine may determine the similarity between user accounts based on attributes of the user account(s) identified in the user accounts' datasets (between the primary user account and potential comparable user account(s)), such as the user's physical characteristic(s) (age, sex, marital status, and/or the like), the user's goal(s), the user's geolocation(s), the resource transmission(s), the frequency of resource transmission(s), and/or the like.

As shown in block 310, the process flow 300 may include the step of identifying, by the time sensitive notification AI engine, at least one comparable user account and an associated at least one comparable user account dataset. For instance, and based on this data from the user account database, the time sensitive notification AI engine may identify at least one comparable user account and its associated comparable user account dataset to use in generating the time sensitive notification for the primary user account. In some embodiments, the time sensitive notification AI engine may identify a plurality of comparable user accounts which may be used in generating the time sensitive notification(s) for the primary user account.

In some embodiments, the time sensitive notification system may require a certain threshold to be met (e.g., a number of comparable attributes which are the same or very similar must be met for the time sensitive notification AI engine to use the associated user account as a comparable user account). In some embodiments, the identification of the certain threshold may be based on a receipt of the certain threshold from a manager of the time sensitive notification system, a receipt of the certain threshold from a client of the time sensitive notification system, a certain threshold based on a feedback loop of the time sensitive notification AI engine (whether the primary user account accepts/uses the time sensitive notification, whether the user ignores the time sensitive notification, whether the primary user account rejects the time sensitive notification, and/or the like), a certain threshold based on the training of the time sensitive notification AI engine, and/or the like.

As shown in block 312, the process flow 300 may include the step of comparing, by the time sensitive notification AI engine, the primary user account dataset and the at least one comparable user account dataset. In some embodiments, the time sensitive notification AI engine may compare the primary user account dataset to the at least one comparable user account dataset(s) to determine suggested time sensitive notification(s) to send to the primary user via their user device. As used herein, the term "compare" refers to a determination of the similarities and differences between the user accounts and associated datasets.

As shown in block 314, the process flow 300 may include the step of generating, based on the comparison of the primary user account dataset and the at least one comparable user account dataset, a time sensitive notification for the primary user account. For instance, the time sensitive notification may comprise data such as comparable user account data, primary user account data, and suggested actions and/or activities for the primary user account based on the comparable user account data. For example, the time sensitive notification may comprise a suggested resource transmission and/or a suggested action for the primary user account based on the comparable user account's dataset, based on the primary user account's historical data, based on the primary user account's current data (such as a current geolocation), and/or the like. Further, the time sensitive notification may be transmitted as a data packet (i.e., a time sensitive notification interface component) to a user device associated with the primary user account, whereby the data packet may then be used to configure the GUI of the user device to automatically and dynamically show the time sensitive notification in real-time as it is generated by the time sensitive notification AI engine.

For instance, the time sensitive notification may identify a current geolocation of the primary user such as a restaurant, a time stamp of the current time (e.g., a Friday night and/or Friday at 7 PM) and determine that the primary user typically generates a resource transmission on Friday nights. Further, the time sensitive notification AI engine may determine that other comparable users that have a goal of going to college in 5 years (similar and/or the same goal as the primary user), then the time sensitive notification system may generate the time sensitive notification to show the primary user that if the primary user keeps the resource transmission under a particular amount for the next X number of Fridays, then the primary user will be able to meet their goal in 5 years.

As shown in block 316, the process flow 300 may include the step of transmitting, based on the time sensitive notification, a time sensitive notification interface component to a user device associated with the primary user account. In some embodiments, the generated time sensitive notification may be used by the time sensitive notification system to generate the time sensitive notification interface component, which is a data packet comprising the data of the time sensitive notification and its associated graphical user interface elements/features, and which is transmitted to a user device (such as the primary user's user device) for configuration of the GUI on the user device. In this manner, the time sensitive notification interface component may show—on the user device's GUI—the time sensitive notification as a push notification. Thus, the GUI of the primary user's user device may be automatically and dynamically configured with the data of the time sensitive notification to show the primary user the time sensitive notification for a set amount of time and/or while the primary user is at the current geolocation.

In some embodiments, the time sensitive notification system may further be configured to "time out" and/or reconfigure the GUI of the user device to show the GUI before the time sensitive notification was sent once certain conditions have been met (e.g., a threshold time for the time sensitive notification has timed out, the geolocation of the user device has changed to a new location, and/or the like). Such an embodiment is described in further detail below with respect to FIG. 7.

Additionally, and in some embodiments, the time sensitive notification interface component may be generated and transmitted dynamically and based on the user device and/or based on a current situation for the primary user. For instance, the time sensitive notification AI engine may determine that interface components of a certain type (e.g., text, email, video, audio, picture, and/or the like) may be more accepted by the primary user based on the specific situation the primary user is in at the current time. Further, and in some embodiments, the time sensitive notification AI engine may determine that the primary is more likely to respond and accept a time sensitive notification interface component comprising a particular image, such as an image of a person graduating, a dream house, a picture of an animal, and/or the like, then the time sensitive notification AI engine may generate the time sensitive notification and time sensitive notification interface component with the more likely accepted data. Additionally, and by way of non-limiting example, the time sensitive notification AI engine may generate the time sensitive notification and time sensitive notification interface component with data to configure the microphone, speaker, and/or vibration mechanism of the user device upon transmission and receipt of the time sensitive notification interface component at the user device. Additionally, and in some embodiments, the time sensitive notification AI engine may also receive primary user input that may be used in generating the time sensitive notification and time sensitive notification interface component, such as a voicemail and/or recording of the primary user which may be transmitted at a predicted time that it will have the greatest impact.

FIG. 4 illustrates a process flow 400 for training the time sensitive notification AI engine, in accordance with an embodiment of the disclosure. In some embodiments, a system (e.g., similar to one or more of the systems described herein with respect to FIGS. 1A-1C) may perform one or more of the steps of process flow 400. For example, a time sensitive notification system (e.g., the system 130 described herein with respect to FIG. 1A-1C) may perform the steps of process 400. In some embodiments, an artificial intelligence engine (e.g., such as the AI engine shown in FIG. 2) may perform some or all of the steps described in process flow 400.

In some embodiments, and as shown in block 402, the process flow 400 may include the step of collecting a first training dataset, wherein the first training dataset comprises data of the at least one comparable user account at a first previous instance. For instance, the time sensitive notification system may collect a first training dataset comprising data of user accounts that may potentially be considered a comparable user account depending on the primary user account considered by the time sensitive notification system and the associated data and attributes of the primary user account. Based on the data and attributes of the primary user account, the time sensitive notification system—by training the time sensitive notification AI engine—may determine which user accounts from the first training dataset are potentially comparable user accounts that share the same and/or similar data and/or attributes. In some embodiments, the time sensitive notification system may request a certain threshold (e.g., a certain number and/or certain types of attributes, such as a goal attribute whereby the goal between the primary user account and the potential comparable user account(s) match) to be similar or the same for the user accounts to be identified as comparable user accounts. Such a certain threshold may be identified, determined, and/or decided by a manager of the time sensitive notification system, a client of the time sensitive notification system (e.g., the client providing the user account database from which the first training dataset is based upon), the time sensitive notification system itself based on training and identifying which comparable user accounts and associated time sensitive notifications generated are accepted by the primary user accounts.

The training dataset(s) (first and second training datasets, and/or the like) may comprise data of various user accounts, such as data regarding geolocations, resource transmissions (including recipient identifiers, sender account identifiers, time stamps, geolocation, frequency of resource transmissions, and/or the like), resource storage accounts (current and historical to identify amounts within resource account historically and currently for a user account), goals (including whether they've been met or not), physical characteristic data of the users associated with the user accounts, and/or the like. Thus, and based on this data, the time sensitive notification system may identify attributes from each of the data and then compare the attributes of the user accounts to the primary user account attributes to determine which attributes match and which attributes do not.

In some embodiments, and as shown in block 404, the process flow 400 may include the step of training the time sensitive notification AI engine at a first instance with the first training dataset. For instance, and once the comparable user account(s) has been identified, the time sensitive notification system may apply the first training dataset to the time sensitive notification AI engine for training. In this manner, and based up on the proper identification of the comparable user account(s) and its associated data, the time sensitive notification AI engine will be trained to identify future potential comparable user accounts in the same manner. Thus, and based on this application, and similar to the processes described above with respect to FIG. 2, the time sensitive notification AI engine may be trained to determine patterns in user account datasets based on historical data, trained to identify comparable user account(s), and trained to generate time sensitive notifications based on the datasets and based on identified goals by the primary user account and the comparable user account(s).

In some embodiments, and as shown in block 406, the process flow 400 may include the step of collecting a second training dataset, wherein the second training dataset comprises data of the at least one comparable user account at a second previous instance. For instance, and similar to the first training dataset and its use in training the time sensitive notification AI engine, the time sensitive notification system may additionally collect a second training dataset comprising data of user accounts that may potentially be considered a comparable user account depending on the primary user account considered by the time sensitive notification system and its associated data and attributes. Such a second training dataset may be collected at a second time or second previous instance (previous to the current period which the time sensitive notification AI engine is trained and in use).

In some embodiments, and as shown in block 408, the process flow 400 may include the step of training the time sensitive notification AI engine at a second instance with the second training dataset. Additionally, and similar to the application of the first training dataset to the time sensitive notification AI engine, the time sensitive notification system, upon determining the comparable user account(s) of the second training dataset, may apply the second training dataset to the time sensitive notification AI engine for further training. In this manner, and based on continuous training of the data by the time sensitive notification AI engine, the time sensitive notification AI engine may continuously refine its determinations of comparable user accounts and its generation of time sensitive notifications.

FIG. 5 illustrates a process flow 500 for determining a current geographic location associated with the primary user account, in accordance with an embodiment of the disclosure. In some embodiments, a system (e.g., similar to one or more of the systems described herein with respect to FIGS. 1A-1C) may perform one or more of the steps of process flow 500. For example, a time sensitive notification system (e.g., the system 130 described herein with respect to FIG. 1A-1C) may perform the steps of process 500. In some embodiments, an artificial intelligence engine (e.g., such as the AI engine shown in FIG. 2) may perform some or all of the steps described in process flow 500.

In some embodiments, and as shown in block 502, the process flow 500 may include the step of determining a current geographic location associated with the primary user account, wherein the determination of the current geographic location is based on at least one of the user device(s)

associated with the primary user account or at least one previously generated dataset. In some embodiments, the process described with respect to block 502 may follow the process described with respect to block 302 of FIG. 3.

For instance, the time sensitive notification system may determine a current geographic location of the primary user based on primary user's user device and its associated geographic location. For instance, the user device of the primary user may comprise geolocation tracking components, such as through the user of a network of satellites that transmit signals for the user device to calculate its own location by triangulation of the received signals. Thus, and as described herein, the primary user may be identified at certain times and certain geolocations based on the user device associated with the primary user account, which will then be used for receiving and showing the time sensitive notification interface component to the primary user.

In some embodiments, the determination of the current geographic location is by the time sensitive notification AI engine based on the at least one previously generated dataset. For instance, the time sensitive notification AI engine may consider the historical geolocation data of the primary user account, the time stamps of the historical geolocation data, and determine a pattern of the geolocations for the primary user in order to determine a likely current and/or future geolocation for the primary user. For example, and when the historical geolocation data shows that the primary user goes to a particular bar or restaurant on Friday evenings from 5 PM to 9 PM for the past month, the time sensitive notification AI engine may determine that the primary user will likely be at the particular bar or restaurant the next, upcoming Friday evening. Further, and based on this determination, the time sensitive notification AI engine may generate the time sensitive notification based on this prediction and suggest an action for the primary user for the next Friday evening at 5 PM to 9 PM.

Such a prediction of the geolocation of the primary user may improve computing functionality and processing speeds by allowing less computing resources to be used in making a current determination of where the primary user is on the next Friday evening, and instead allows for the time sensitive notification system to pre-generate the time sensitive notification without the need to determine a current geolocation using multiple computing resources, such as multiple satellites and triangulation.

FIG. 6 illustrates a process flow 600 for identifying at least one comparable user account, in accordance with an embodiment of the disclosure. In some embodiments, a system (e.g., similar to one or more of the systems described herein with respect to FIGS. 1A-1C) may perform one or more of the steps of process flow 600. For example, a time sensitive notification system (e.g., the system 130 described herein with respect to FIG. 1A-1C) may perform the steps of process 600. In some embodiments, an artificial intelligence engine (e.g., such as the AI engine shown in FIG. 2) may perform some or all of the steps described in process flow 600.

In some embodiment, and as shown in block 602, the process flow 600 may include the step of determining at least one primary account attribute of the primary user account, wherein the at least one primary account attribute comprises at least one of an account type attribute, a historical transmission attribute, a geolocation attribute, a physical characteristic attribute, or an objective attribute. For instance, the time sensitive notification system may determine at least one primary account attribute of the primary user account whereby the attribute is based on the data of the primary user account (such as the historical data and/or the current data). Such an attribute and/or attributes may comprise an account type attribute (e.g., whether a resource account associated with the primary user account is a resource storage account, a resource advance account, a resource investment account, and/or the like); a historical transmission attribute (e.g., a historical transmission frequency attribute indicating the amount of resource transmissions over a period, a recipient identifier, a sender identifier, an amount of the resource transmission(s), and/or the like); a geolocation attribute (e.g., the historical geolocations of the primary user and/or the current geolocation of the primary user, which may comprise a city identifier, a state identifier, a country identifier, an address identifier, a company/entity identifier, and/or the like); a physical characteristic attribute (e.g., a sex of the primary user, an oldness of the primary user, a marital status of the primary user, a familial status of the primary user, and/or the like); an objective attribute (e.g., a goal or objective of the primary user); and/or the like.

In some embodiments, the objective attribute may comprise an objective or goal that has previously been input and/or selected by the primary user account. Such an input or selection may comprise an interaction with the primary user's user device's GUI, whereby the primary user may have input using the GUI configured by the time sensitive notification system to request an indication of a particular goal the primary user may wish to meet when using the time sensitive notification system. In some embodiments, the time sensitive notification AI engine may generate a plurality of suggested objectives or goals for the primary user to select from, whereby the plurality of suggested objectives or goals may be based on comparable user accounts and their associated goals or objectives and based on the primary user account's associated data and what the primary user account may be lacking.

In some embodiments, and as shown in block 604, the process flow 600 may include the step of determining at least one comparable attribute based on the at least one primary account attribute. For instance, the time sensitive notification system may determine at least one comparable attribute based on the primary user account's attribute(s), whereby the at least one comparable attribute(s) are the same as the primary user account's attributes. Such comparable attributes may be identified or determined for the purpose of matching the attributes of potential comparable user accounts, in order to determine comparable user accounts for the primary user account. In some embodiments, the time sensitive notification system may only use particular primary user account attributes in generating the comparable attribute(s), such as the objective attribute, the geolocation attribute(s), and/or the like. In this manner, the time sensitive notification system may efficiently and accurately determine comparable user accounts with less data (less attributes), less computing resources (e.g., by comparing less attributes between the primary user account and the potential comparable user account(s)), less time, and less computing storage.

Thus, and based on the determined comparable attributes, the time sensitive notification system may determine whether any of the potential comparable user accounts of a database and/or of a dataset (such as the training datasets) comprise the same attributes and should be identified as comparable user accounts.

In some embodiments, and as shown in block 606, the process flow 600 may include the step of identifying the at least one comparable user account based on the at least one comparable user account comprising the at least one comparable attribute. For instance, the time sensitive notification system may identify—based on the comparable attribute(s)—at least one comparable user account that comprises the same attributes as the comparable attributes. Further, and upon identifying the at least one comparable user account(s), the time sensitive notification system may use the data of the comparable user accounts to generate the time sensitive notification(s), like that described in further detail above.

In some embodiments, the time sensitive notification system may additionally and/or alternatively use the investment account data associated with the user account(s) (including but not limited to the data regarding each investment account, its transmissions, its profits, its losses, its timestamps for transmissions—including buying and selling the investments—its amount and timestamps for receiving resources from a resource storage account and/or resource advance account, its timestamps and amounts for receiving resources at the resource storage account and/or resource advance account, whether the user used advice from a particular entity or not and the outcome of such advice, and/or the like). Thus, and by of example, the time sensitive notification AI engine may be trained on such data as that described herein to generate time sensitive notifications for a user to show the user when they should transmit resources to a resource investment account, sell the resources from the resource investment account, buy resources within the resource investment account, and/or choose investment recipients for the resources within the resource investment account. In this manner, and by way of non-limiting example, the time sensitive notification system may use data from the primary user account (including the primary user account's historical resource accounts, both from a particular entity and/or from a plurality of entities, such as a plurality of financial institutions) and use data from comparable user accounts to generate time sensitive notification(s) for the primary user with respect to the investment of resources from the resource investment account.

FIG. 7 illustrates a process flow 700 for determining an acceptance, an ignorance, or a rejection of the time sensitive notification, in accordance with an embodiment of the disclosure. In some embodiments, a system (e.g., similar to one or more of the systems described herein with respect to FIGS. 1A-IC) may perform one or more of the steps of process flow 700. For example, a time sensitive notification system (e.g., the system 130 described herein with respect to FIG. 1A-1C) may perform the steps of process 700. In some embodiments, an artificial intelligence engine (e.g., such as the AI engine shown in FIG. 2) may perform some or all of the steps described in process flow 700.

In some embodiments, and as shown in block 702, the process flow 700 may include the step of receiving—based on the transmission of the time sensitive notification interface component (like that shown in block 314 of FIG. 3)—a primary user input from the user device, wherein the primary user input comprises an acceptance of the time sensitive notification or a rejection of the time sensitive notification. For instance, the time sensitive notification system may receive a primary user input from the user device associated with the primary user account, whereby the primary user input may comprise an indication from the primary user of an acceptance or rejection of the time sensitive notification. In some embodiments, the acceptance or rejection indication may comprise a user input on the GUI of the primary user device, which may comprise an interface component directed to an acceptance "button" on the GUI (e.g., an "OK" button for the time sensitive notification which may be selected by touching the surface of the user device at the location of the "OK" button) or a rejection "button" on the GUI (e.g., a "NO" or "IGNORE" button for the time sensitive notification which may be selected by touching the surface of the user device at the location of the "NO" or "IGNORE" button).

In some embodiments, and upon receiving the primary user input from the user device, the time sensitive notification system may feedback and/or input the primary user input to the time sensitive notification AI engine for further training for both the primary user account and the future primary user accounts the time sensitive notification system may consider.

In some embodiments, and as shown in block 704, the process flow 700 may include the step of training the time sensitive notification AI engine with the primary user input. Thus, and upon receiving the primary user input from the user device, the time sensitive notification system may feedback and/or input the primary user input to the time sensitive notification AI engine for further training for both the primary user account and the future primary user accounts the time sensitive notification system may consider. In this manner, the time sensitive notification AI engine may make better predictions of what the primary user account may accept in the future for time sensitive notifications, what the primary user account may reject in the future for time sensitive notifications, and may change its predictions accordingly and dynamically.

In some embodiments, and as shown in block 706, the process flow 700 may include the step of identifying—based on the transmission of the time sensitive notification interface component (like that shown in block 314 of FIG. 3)—a time-lapse of the time sensitive notification interface component, wherein the time-lapse comprises a pre-determined period for the time sensitive notification interface component to configure a GUI of the user device. In some embodiments, the primary user may not input an indication of an acceptance or rejection of the time sensitive notification, but instead may ignore and/or clear the time sensitive notification interface component until a pre-determined period has been met.

By way of non-limiting example, the pre-determined period may comprise a pre-set period of time for the time sensitive notification interface component to configure the GUI of the primary user device, whereby a time lapse of the pre-determined period will occur when input from the primary user regarding the time sensitive notification does not occur. Thus, and in some embodiments, the time-lapse of the pre-determined period may allow the time sensitive notification system to transmit an interface component (e.g., a data packet) to the user device to indicate the time sensitive notification interface component should be cleared from the primary user device. Further, and in some embodiments, the time sensitive notification system may transmit an automatically executing demand to the primary user device to clear the time sensitive notification interface component and re-instate the previously generated interface component of the GUI before the time sensitive interface component configured the GUI of the user device. In this manner, and upon the time-lapse of the time sensitive notification interface component's pre-determined period, the GUI of the user device will return to normal (it's pre-time sensitive notification interface component state).

In some embodiments, and as shown in block 708, the process flow 700 may include the step of determining the time-lapse of the time sensitive notification interface component meets the pre-determined period. For instance, the time sensitive notification system determine the time-lapse of the time sensitive notification interface component has met the pre-determined period without primary user input, such that the time-lapse is the same as the pre-determined period.

In some embodiments, and as shown in block 710, the process flow 700 may include the step of identifying, based on the time-lapse of the time sensitive notification interface component meeting the pre-determined period, a non-user input. For example, the non-user input may comprise an input by the primary user on the GUI of the user device such as an exiting and/or clearing of the time sensitive notification interface component (without an explicit acceptance or rejection input like that described above) or may comprise no interaction from the primary user at the GUI of the user device at all with respect to time sensitive notification interface component. In this manner, the primary user may have interacted with other interface components of the GUI on the user device, but not with the time sensitive notification interface component during the pre-determined period.

In some embodiments, and as shown in block 712, the process flow 700 may include the step of training the time sensitive notification AI engine with the non-user input. Similar to the training of the time sensitive notification AI engine with the primary user input (like that described above with respect to block 704), the time sensitive notification system may additionally and/or alternatively apply the non-user input to the time sensitive notification AI engine for further training of the time sensitive notification AI engine. In this manner, the time sensitive notification AI engine may be trained to specifically identify which time sensitive notifications the primary user (and other such future primary users) will likely interact with.

In some embodiments, and as shown in block 714, the process flow 700 may include the step of identifying a real-time transmission associated with the time sensitive notification. By way of non-limiting example, the time sensitive notification system may identify a real-time transmission (such as a resource transmission identified in real-time from the primary user account to a recipient account) and may determine whether the real-time transmission should be associated with the time sensitive notification. For instance, and where the time sensitive notification comprises an indication to the primary user not to transmit a resource transmission above a pre-determined amount to a recipient identifier (e.g., a restaurant, a company, and/or the like) in order to meet the primary user's goal, and the time sensitive notification system identifies a real-time transmission to the recipient identifier below, at, and/or above the determined amount, then the time sensitive notification system will determine the real-time transmission is in fact associated with the time sensitive notification. In the instance where the resource transmission is at or below the pre-determined amount of the time sensitive notification, then the time sensitive notification system may determine the time sensitive notification was helpful and that the primary user accepted the time sensitive notification interface component even if the primary user did not transmit a primary user input via the GUI of the user device. However, and in the instance where the resource transmission exceeds the pre-determined amount of the time sensitive notification, then the time sensitive notification system may determine the time sensitive notification interface component was rejected by the primary user even if the primary user did not transmit a primary user input via the GUI of the user device.

In some embodiments, and as shown in block 716, the process flow 700 may include the step of training the time sensitive notification AI engine with the real-time transmission. In some embodiments, and based on this identified real-time transmission, the time sensitive notification system may input the data of the acceptance or rejection of the time sensitive notification interface component to the time sensitive notification AI engine for training.

In some embodiments, and as shown in block 718, the process flow 700 may include the step of configuring—based on the time-lapse of the time sensitive notification interface component meeting the pre-determined period—the GUI of the user device with a pre-notification interface component. Additionally, and/or alternatively, the time sensitive notification system may configure the GUI of the user device with the pre-notification interface component (e.g., the interface component(s) of the GUI before the time sensitive notification interface component was transmitted to the user device) when the time-lapse of the pre-determined period has been met. In this manner, the GUI of the user device will not comprise multiple time sensitive notification interface components which have previously expired and are no longer applicable to the primary user.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for implementing artificial intelligence (AI) to generate a time-sensitive notification related to configuration of graphical user interfaces (GUIs), the system comprising:

a memory device with computer-readable program code stored thereon;

at least one processing device, wherein executing the computer-readable code is configured to cause the at least one processing device to perform the following operations:

identify a primary user account;

collect a primary user account dataset, wherein the primary user account dataset comprises at least one of a previously generated data or a currently generated data;

apply a time sensitive notification AI engine to the primary user account, wherein the time sensitive notification AI engine is trained with the primary user account dataset;

access, by the time sensitive notification AI engine, a user account database;

identify, by the time sensitive notification AI engine, at least one comparable user account and an associated at least one comparable user account dataset, wherein the time sensitive notification AI engine compares a plurality of comparable attributes of the at least one comparable user account to a plurality of primary attributes of the primary user account;

determine, by the time sensitive AI engine, the plurality of comparable attributes matches the plurality of primary attributes, wherein the matching comprises a threshold amount of the plurality of primary attributes;

compare, by the time sensitive notification AI engine, the primary user account dataset and the at least one comparable user account dataset;

generate, based on the comparison of the primary user account dataset and the at least one comparable user account dataset, a time sensitive notification for the primary user account;

transmit, based on the time sensitive notification, a time sensitive notification interface component to a user device associated with the primary user account; and determine a current geographic location associated with the primary user account, wherein the determination of the current geographic location is based on at least one of the user device associated with the primary user account or at least one previously generated dataset, wherein the determination of the current geographic location is by the time sensitive notification AI engine based on the at least one previously generated dataset.

2. The system of claim 1, wherein the computer-readable code is configured to cause the at least one processing device to perform the following operations:

collect a first training dataset, wherein the first training dataset comprises data of the at least one comparable user account at a first previous instance;

train the time sensitive notification AI engine at a first instance with the first training dataset;

collect a second training dataset, wherein the second training dataset comprises data of the at least one comparable user account at a second previous instance; and train the time sensitive notification AI engine at a second instance with the second training dataset.

3. The system of claim 1, wherein the comparison of the primary user account dataset and the at least one comparable user account dataset further comprises:

determine at least one primary account attribute of the primary user account, wherein the at least one primary account attribute comprises at least one of an account type attribute, a historical transmission attribute, a geolocation attribute, a physical characteristic attribute, or an objective attribute;

determine at least one comparable attribute based on the at least one primary account attribute; and identify the at least one comparable user account based on the at least one comparable user account comprising the at least one comparable attribute.

4. The system of claim 3, wherein the objective attribute comprises an objective attribute input or selected by the primary user account.

5. The system of claim 1, wherein the computer-readable code is configured to cause the at least one processing device to perform the following operations:

receive, based on the transmission of the time sensitive notification interface component, a primary user input from the user device, wherein the primary user input comprises an acceptance of the time sensitive notification or a rejection of the time sensitive notification; and train the time sensitive notification AI engine with the primary user input.

6. The system of claim 1, wherein the computer-readable code is configured to cause the at least one processing device to perform the following operations:

identify, based on the transmission of the time sensitive notification interface component, a time-lapse of the time sensitive notification interface component, wherein the time-lapse comprises a pre-determined period for the time sensitive notification interface component to configure a GUI of the user device;

determine the time-lapse of the time sensitive notification interface component meets the pre-determined period;

identify, based on the time-lapse of the time sensitive notification interface component meeting the pre-determined period, a non-user input; and train the time sensitive notification AI engine with the non-user input.

7. The system of claim 6, wherein the computer-readable code is configured to cause the at least one processing device to perform the following operation configure, based on the time-lapse of the time sensitive notification interface component meeting the pre-determined period, the GUI of the user device with a pre-notification interface component.

8. The system of claim 6, wherein the computer-readable code is configured to cause the at least one processing device to perform the following operation identify a real-time transmission associated with the time sensitive notification; and train the time sensitive notification AI engine with the real-time transmission.

9. A computer program product for implementing artificial intelligence (AI) to generate a time-sensitive notification related to configuration of graphical user interfaces (GUIs), wherein the computer program product comprises at least one non-transitory computer-readable medium having computer-readable program code portions embodied therein, the computer-readable program code portions which when executed by a processing device are configured to cause the processor to perform the following operations:

identify a primary user account;

collect a primary user account dataset, wherein the primary user account dataset comprises at least one of a previously generated data or a currently generated data;

apply a time sensitive notification AI engine to the primary user account, wherein the time sensitive notification AI engine is trained with the primary user account dataset;

access, by the time sensitive notification AI engine, a user account database;

identify, by the time sensitive notification AI engine, at least one comparable user account and an associated at least one comparable user account dataset, wherein the time sensitive notification AI engine compares a plurality of comparable attributes of the at least one comparable user account to a plurality of primary attributes of the primary user account;

determine, by the time sensitive AI engine, the plurality of comparable attributes matches the plurality of primary attributes, wherein the matching comprises a threshold amount of the plurality of primary attributes;

compare, by the time sensitive notification AI engine, the primary user account dataset and the at least one comparable user account dataset;

generate, based on the comparison of the primary user account dataset and the at least one comparable user account dataset, a time sensitive notification for the primary user account;

transmit, based on the time sensitive notification, a time sensitive notification interface component to a user device associated with the primary user account; and determine a current geographic location associated with the primary user account, wherein the determination of the current geographic location is based on at least one of the user device associated with the primary user account or at least one previously generated dataset, wherein the determination of the current geographic location is by the time sensitive notification AI engine based on the at least one previously generated dataset.

10. The computer program product of claim 9, wherein the processing device is configured to cause the processor to perform the following operations:

collect a first training dataset, wherein the first training dataset comprises data of the at least one comparable user account at a first previous instance;

train the time sensitive notification AI engine at a first instance with the first training dataset;

collect a second training dataset, wherein the second training dataset comprises data of the at least one comparable user account at a second previous instance; and train the time sensitive notification AI engine at a second instance with the second training dataset.

11. The computer program product of claim 9, wherein the processing device is configured to cause the processor to perform the following operations:

determine at least one primary account attribute of the primary user account, wherein the at least one primary account attribute comprises at least one of an account type attribute, a historical transmission attribute, a geolocation attribute, a physical characteristic attribute, or an objective attribute;

determine at least one comparable attribute based on the at least one primary account attribute; and identify the at least one comparable user account based on the at least one comparable user account comprising the at least one comparable attribute.

12. A computer implemented method for implementing artificial intelligence (AI) to generate a time-sensitive notification related to configuration of graphical user interfaces (GUIs), the computer implemented method comprising:

identifying a primary user account;

collecting a primary user account dataset, wherein the primary user account dataset comprises at least one of a previously generated data or a currently generated data;

apply a time sensitive notification AI engine to the primary user account, wherein the time sensitive notification AI engine is trained with the primary user account dataset;

accessing, by the time sensitive notification AI engine, a user account database;

identifying, by the time sensitive notification AI engine, at least one comparable user account and an associated at least one comparable user account dataset, wherein the time sensitive notification AI engine compares a plurality of comparable attributes of the at least one comparable user account to a plurality of primary attributes of the primary user account;

determining, by the time sensitive AI engine, the plurality of comparable attributes matches the plurality of primary attributes, wherein the matching comprises a threshold amount of the plurality of primary attributes;

comparing, by the time sensitive notification AI engine, the primary user account dataset and the at least one comparable user account dataset;

generating, based on the comparison of the primary user account dataset and the at least one comparable user account dataset, a time sensitive notification for the primary user account;

transmitting, based on the time sensitive notification, a time sensitive notification interface component to a user device associated with the primary user account; and determining a current geographic location associated with the primary user account, wherein the determination of the current geographic location is based on at least one of the user device associated with the primary user account or at least one previously generated dataset, wherein the determination of the current geographic location is by the time sensitive notification AI engine based on the at least one previously generated dataset.

13. The computer implemented method of claim 12, the method comprising:

collecting a first training dataset, wherein the first training dataset comprises data of the at least one comparable user account at a first previous instance;

training the time sensitive notification AI engine at a first instance with the first training dataset;

collecting a second training dataset, wherein the second training dataset comprises data of the at least one comparable user account at a second previous instance; and training the time sensitive notification AI engine at a second instance with the second training dataset.

14. The computer implemented method of claim 12, the method further comprising:

determining at least one primary account attribute of the primary user account, wherein the at least one primary account attribute comprises at least one of an account type attribute, a historical transmission attribute, a geolocation attribute, a physical characteristic attribute, or an objective attribute;

determining at least one comparable attribute based on the at least one primary account attribute; and identifying the at least one comparable user account based on the at least one comparable user account comprising the at least one comparable attribute.

* * * * *